Figure 1:
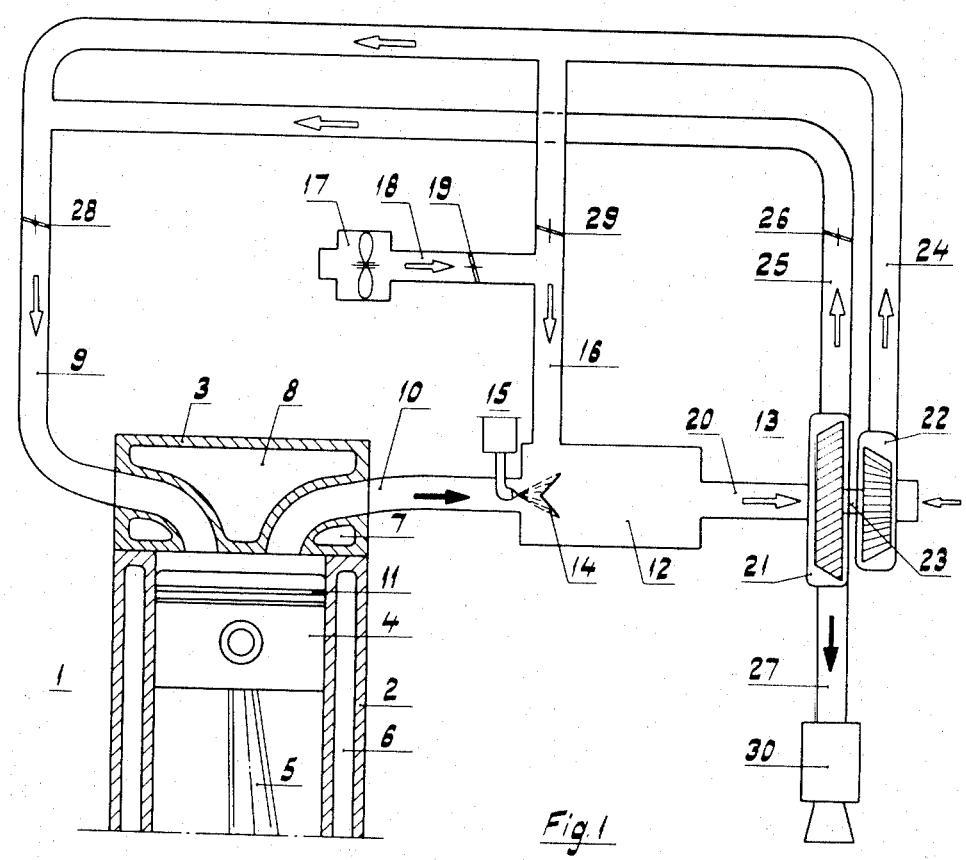

United States Patent [19]

Gadefelt

[11] 3,775,971
[45] Dec. 4, 1973

[54] SYSTEM FOR CONTROLLING THE SUPPLY OF AIR TO AN INTERNAL COMBUSTION ENGINE

[75] Inventor: Bengt Georg Gadefelt, Sodertalje, Sweden

[73] Assignee: Saab-Scania Aktiebolag, Sodertalje, Sweden

[22] Filed: Mar. 28, 1972

[21] Appl. No.: 238,770

[30] Foreign Application Priority Data
Apr. 5, 1971 Sweden.............................. 4410/71

[52] U.S. Cl...................... 60/13 N, 60/278, 60/280, 60/299
[51] Int. Cl....................... F02b 37/04, F02b 41/10
[58] Field of Search.................. 60/13 N, 13 R, 278, 60/280, 288, 39.52, 307, 299; 123/119 CA, 119 CB

[56] References Cited
UNITED STATES PATENTS

| | | | |
|---|---|---|---|
| 3,513,929 | 5/1970 | Dae Sik Kim............................ | 60/13 |
| 3,096,615 | 7/1963 | Zuhn..................................... | 60/13 |
| 3,469,393 | 9/1969 | Tryhorn....................... | 123/119 CB |
| 2,306,277 | 12/1942 | Oswald.................... | 123/119 CA |
| 3,406,515 | 10/1968 | Behrens................................ | 60/288 |
| 2,807,930 | 10/1957 | Bratton................................ | 60/280 |
| 3,306,033 | 2/1967 | Cornelius................................ | 60/13 |
| 3,423,927 | 1/1969 | Scherenberg............................. | 60/13 |
| 3,163,984 | 1/1965 | DuMont.................................. | 60/13 |

FOREIGN PATENTS OR APPLICATIONS

| | | | |
|---|---|---|---|
| 1,040,839 | 10/1958 | Germany............................... | 60/13 |
| 1,142,556 | 4/1957 | France.................................. | 60/13 |

Primary Examiner—Carlton R. Croyle
Assistant Examiner—Warren Olsen
Attorney—John W. Malley et al.

[57] ABSTRACT

The present invention relates to a system for controlling the supply of air to an internal combustion engine having a supercharging unit which includes an exhaust turbine and a compressor driven thereby, there being arranged in an exhaust line between the engine and the supercharging unit an afterburner to which is fed fresh air from the compressor of the supercharging unit and fuel supplied from a fuel pump. According to the present invention an electrically driven air pump is arranged to feed supplementary air to the afterburner, and also recirculation means are provided for returning a portion of the exhaust gases from the afterburner to the engine via the exhaust turbine. In this way the torque characteristic of the engine is improved, and also the content of contaminating solid products in the exhaust gases is reduced.

4 Claims, 2 Drawing Figures

PATENTED DEC 4 1973　　　　　　　　　　　3,775,971

SYSTEM FOR CONTROLLING THE SUPPLY OF AIR TO AN INTERNAL COMBUSTION ENGINE

The present invention relates to a supercharged internal combustion engine and more specifically to a system by which the supply of air to respective cylinders of the engine is controlled and compensated in response to such engine parameters as gas pressure and temperature, and which enables a high engine power to be obtained over a wide range of engine speed while considerably reducing the content of harmful combustion products in the engine exhaust gases.

Turbo-superchargers of the type which utilize the pressure energy of exhaust gases in their operation and which consist mainly of a turbine unit and a compressor unit are known to the art, such superchargers generally being known as exhaust gas turbo-superchargers and used preferably with diesel engines. With such superchargers the pressure energy and thermal energy of the exhaust gases is converted in the turbine to kinetic energy which is transmitted to the compressor for the purpose of driving the same. The compressor draws in air in a known manner and passes it to the engine intake pipe. Owing to the fact that in this way a larger quantity of air can be passed to respective engine cylinders than that normally obtained during the suction stroke, it is possible to combust a larger quantity of fuel. Thus, in this way the average pressure of the engine and the average engine power is increased, while the increase in engine volume and weight is negligible.

The power developed by the turbine of such a supercharging unit mainly depends on the quantity and temperature of exhaust gases delivered by the engine. In practice the power provided by the turbine and compressor is unnecessarily high at high engine speeds and full loads, while at low engine speeds the power delivered by the turbine and compressor is insufficient to supply sufficient air to the respective cylinders of the engine to maintain a favourable torque characteristic.

It is also known to arrange in an exhaust pipe extending from the engine to the supercharging unit an afterburner to which is fed fresh air from the compressor of the supercharging unit in order to reduce by afterburning the contamination content of the exhaust gases, and to which afterburner is also fed fuel from a fuel pump controlled by such engine parameters as engine speed. With this system the energy content of the exhaust gases and the energy released in the afterburner is converted to engine power, the additional energy for the turbine of the supercharging unit being obtained by burning the combustible components in the exhaust gases in the afterburner and by burning additional fuel.

The object of the present invention is to improve the torque characteristic of internal combustion engines, particularly at low speeds, by providing an extra energy input, and to reduce the content of contaminating, solid products of combustion in the exhaust gases developed.

These objects are obtained by means of the present invention which is mainly characterized in that an electrically driven air pump is arranged to feed supplementary air to the afterburner when the quantity of air arriving from the compressor is insufficient for the process of combustion in said afterburner, and in that recirculation means are provided for returning a portion of the exhaust gases from the afterburner to the engine via the exhaust turbine.

In accordance with the system of the invention, air in quantities adapted according to the aforementioned engine parameters is supplied to the afterburner for the purpose of obtaining a combustion product poor in substances which are deleterious to the environment and also, highly pure exhaust gases can be obtained. By recirculating the exhaust gases, especially the content of nitrous oxides in the exhaust gases, can be reduced, and when starting the engine and when driving at low engine temperatures the air drawn into the engine is advantageously preheated. In addition, an engine having high power over a wide range of engine speeds is obtained. The gear changes required in such an engine when installed in a vehicle are few in number and the engine provided with the system of the invention enables a simplified gearbox to be installed. However, it is necessary for the purpose of realising the concept of the present invention that both the engine and the elements forming part of the system are constructed to withstand the increased loads to which they are subjected and in a manner suitable to obtain the desired function of the system.

Further, it is advantageous that the portion of the recirculating means located between the turbine of the supercharging unit and the engine inlet pipe is provided with throttle means controlled by such engine parameters as engine speed, gas pressure and gas temperature. In this way the recirculation ratio can be easily controlled.

Still further, it is necessary that the process of combustion in the engine and in the afterburner can be adjusted to suit varying conditions, and for this reason throttle means capable of being individually controlled are embodied in the system of the present invention for the purpose of regulating the air supply from the compressor to the engine and the flow of air from the air pump, this latter element of the system being arranged to operate only under certain conditions. The throttle means may be in the form, for example, of valves controlled by signals transmitted in response to engine conditions prevailing after the compressor, for example such conditions as engine speed, air temperature and air pressure. The additional fuel supply to the afterburner is also controlled in a known manner in response to changes in the above conditions.

All of the throttle means incorporated in the system of the present invention co-act to provide the desired engine torque characteristic, while at the same time maintaining a minimum quantity of contaminating substances in the exhaust gases. The invention will now be described in more detail with reference to an embodiment thereof illustrated in the accompanying drawing, of which FIG. 1 illustrates schematically an embodiment of the system according to the present invention, and FIG. 2 shows in the form of a diagram how such a system affects the torque characteristic of an engine.

Figure 2:
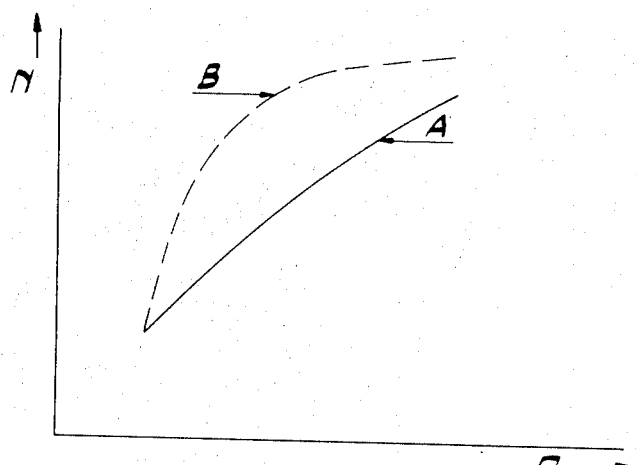

Illustrated in FIG. 1 is an internal combustion engine of the piston type of which only a cylinder 2, a cylinder block 3, a piston 4 and a connecting rod 5 is shown. The cylinder 2 is jacket-cooled and is provided with a cooling passage 6. Formed in the cylinder block 3, which is securely mounted to an engine block (not shown) embodying the cylinders 2, are cooling passages 7,8 and an inlet pipe 9 for conducting air for combustion to respective cylinders 2, and an outlet pipe 10 for exhaust gases. The piston 4 is pivotally connected to the upper end of a connecting rod 5 and is arranged to convert axial linear movements into rotary movements for a crank-shaft (not shown) supporting the connecting rod 5. Although not shown in the drawing, the crank-shaft is provided with a flywheel for the purpose of equalizing impact forces occurring at the dead centre positions of the piston 4 and to maintain rotary movement of the crank-shaft during those periods when no force is exerted on the piston 4.

The piston 4 is provided with sealing rings 11 for the purpose of sealing the space formed between the piston 4 and the cylinder block 3. The portion of the cylinder 2 located above the piston 2 when the piston occupies its top-dead-centre position is called the compression or combustion chamber. Inlets and outlets leading to and from the chambers are regulated by means of valves (not shown) responsive to the working sequense of the engine. The working sequence of an internal combustion engine is well known and in brief involves feeding to the combustion chamber an air-fuel mixture which mixture when ignited and combusted generates large quantities of heat, wherewith the exhaust gases produced during the process of combustion obtain a high temperature and high pressure. Under the influence of the exhaust gases, the piston 4 is forced to its bottom-dead-centre position. As the piston 4 returns to its top-dead-centre position, the gases of combustion are ejected through the outlet pipe 10, whereafter the engine cycle is repeated.

As is well known, however, the exhaust gases from an internal combustion engine contain incompletely combusted particles such as hydrocarbons, for example. It has been established analytically that the exhaust gases contain several hundred different components, the percentage of which vary, depending on the operating conditions of the engine. The most harmful of these components from the aspect of environmental care and protection, however, are the non-combusted hydrocarbons and carbon-monoxide, together with nitrous gases. Bearing this in mind, the system of the present invention is constructed for the purpose of afterburning and re-circulating the exhaust gases and for recovering the energy released during the afterburning process and putting this energy to useful work in the engine. Accordingly, the illustrated embodiment of the system includes an afterburner 12 and a supercharging unit 13 connected to the exhaust outlet pipe 10 of the engine. The afterburner 12 is of conventional type provided with a nozzle 14 securely mounted to one end thereof. A fuel pump 15 is connected to the outlet pipe 10 and is arranged to inject fuel into the afterburner 12. Further, the fuel pump 15 is arranged to be made operative and inoperative in response to engine parameters in a manner known with internal combustion engine fuel supply means. The fuel injected into the afterburner 12 is atomized by the nozzle 14 and the droplets of fuel adhering thereto are entrained by the exhaust gases issuing under high pressure intermittently from the engine 1, and by the air inflowing via a passage 16, whereafter the mixture in the after-burner 12 is combusted.

To ensure that sufficient air is constantly passed to the afterburner 12 for the process of combustion to take place therein, a controlled quantity of air is fed to the afterburner via the conduit 16 from two sources, one of which is the supercharging unit 13 and the other an electric air pump 17. The air pump 17 is preferably constructed to become operative at low engine speeds and at idling speeds since the air drawn in by the supercharging unit 13 is not capable under such conditions to maintain complete combustion in the afterburner 12. The air pump 17 is suitably made operative and inoperative by means of servo means (not shown) controlled by engine parameters in a known manner. For the purpose of further adjusting the quantity of air fed through the air pump 17 and the inlet conduit 16, there is arranged in a conduit 18 extending between the pump and the conduit 16 a throttle 19 which is also controlled by certain engine parameters.

The pressure energy and thermal energy issued from the engine 1 and also generated in the afterburner 12 is transmitted from the afterburner 12 via a continuation 20 of the outlet pipe 10 to the supercharging unit 13. In the illustrated embodiment, the supercharging unit 13 comprises the following main parts: an exhaust turbine 21, a bearing housing (not shown) and a compressor 22. The turbine 21 and the compressor 22 are mounted on their respective sides of the bearing housing and a shaft 23 is arranged to connect the turbine wheel with the compressor wheel. In accordance with the invention, the energy contained in the exhaust gases from the afterburner 12 is utilized in the turbine 21, and to this end the exhaust gases are conducted in a known manner to a turbine housing in which they are caused to pass through a system of guide vanes (not shown) before impinging on the turbine wheel, in order to impart a higher speed to the gases. The pressure energy of the exhaust gases is converted in the turbine wheel to kinetic energy which is transmitted to the compressor wheel through the shaft 23.

The major portion of the exhaust gases is conducted from the turbine housing to atmosphere via an outlet pipe 27, via the remaining portion of the exhaust gases, varying to 25 percent of the total, are conducted from the turbine housing via a conduit 25 and recycled to the engine inlet pipe 9. This recirculation of a portion of the exhaust gases is advantageous under certain engine conditions, for example when starting the engine and when using the engine for braking. The system according to the present invention has also been found advantageous from the aspect of reducing the content of nitrous gases in the exhaust gases. The recirculation ratio is controlled by a throttle means 26, e.g., in the form of a valve or throttle plate mounted in the conduit 25, and like the other control functions the exhaust gas recirculation is controlled by such engine parameters as gas pressure and gas temperature.

The compressor 22 draws in a quantity of air proportional to the quantity of kinetic energy transmitted thereto from the turbine 21. The air is drawn in at the centre of the compressor wheel and is forced radially outwards in the compressor housing through a diffuser. The compressor 22 feeds air via the diffuser and the conduit 24 to the engine inlet pipe 9 and to the inlet pipe 16 of the afterburner 12. Located in the inlet pipe 9 is a throttle means 28 arranged to be controlled in a known manner by the engine speed, air pressure and/or air temperature. Such control of the air flowing through the engine inlet pipe 9 is previously known in diesel engines, the valve controlling the flow to the combustion chamber being so controlled by the aforementioned parameters that the desired air-fuel mixture is obtained. A controllable throttle means 29 is also arranged in the inlet line 16 of the afterburner 12, the throttle means 29 also being controlled by the aforementioned engine parameters in a manner to obtain a suitable quantity of air to the afterburner.

The manner in which the throttle means 26, 28 and 29 are controlled and the construction of the control means, engine parameter sensing means and throttle means can, in accordance with the concept of the invention, be varied within the framework of known constructive solutions and are therefore not limited to those described and illustrated. Thus, it is known to control the throttle means in systems provided with electronically controlled fuel injection means in a manner to obtain the desired fuel-air mixture. Although not restricted thereto, the throttle means illustrated and described in connection with the illustrated embodiment of the invention can also be caused to adopt positions corresponding to the aforementioned engine parameters.

The system of the present invention is also suitably provided with a known catalyst 30 located in the exhaust pipe, indicated at 27, for the purpose of finally treating the exhaust gases flowing from the turbine housing. The catalyst 30 serves to free the exhaust gases from their content of primarily residual carbon monoxide, non-combusted hydrocarbons and nitrous oxides by chemical processes. The action and design of such catalysts are known to the art.

FIG. 2 ilustrates a graph showing how the system of the present invention affects the torque characteristic of an internal combustion engine. The curve A shows how the power of a conventional internal combustion engine varies as a function of engine speed. Since the Otto-cycle internal combustion engine operates within a wide range of engine revolutions, the supercharged version obtains a highly disadvantageous power curve for normal ranges of engine speed. In view of this, supercharged Otto-cycle engines are only used in certain types of sport vehicles or the like to provide for a full engine power at high engine speeds. In the case of diesel engines, however, the conditions are different as a result of the use to which such engines are put, their high compression ratios and favourable combustion processes, etc., while heavy trucks are also provided with supercharged engines.

Curve B in FIG. 2 illustrates in the same manner how the engine power of an engine provided with the system of the present invention is increased over a wider range of engine speed. As will be seen from the diagram, the system of the present invention enables the desired engine power and torque characteristic to be obtained both in respect of diesel engines and Otto-cycle engines at the same time as the content of harmful products in the exhaust gases is reduced.

The invention is not restricted to the described and illustrated embodiment but can be modified within the scope of the following claims.

What is claimed is:

1. A system for controlling and compensating the supply of air to an internal combustion engine of the type having a super charging unit including a turbine, an exhaust gas line leading from said engine to said turbine for driving said turbine by said engine's exhaust gases, an air compressor drivingly connected to said turbine, an air inlet to said compressor and a high pressure air line leading from said compressor to said engine, an afterburner disposed in said exhaust gas line between said engine and said turbine, a branch line leading from said high pressure line to said afterburner, fuel pump means for delivering fuel to said afterburner at a controlled rate, the improvement comprising an electrically driven air pump connected to said branch line to supply supplementary air to said branch line when the air flow in said branch line falls below a predetermined level, and a recirculation line connected between said turbine and said engine for recirculating at least part of the engine's exhaust gases to said engine.

2. The system as claimed in claim 1, wherein said recirculation line is provided with throttle means for regulating the flow of gases therethrough.

3. The system as claimed in claim 1 wherein said recirculation line and said high pressure air line are combined to form a common inlet to said engine and throttle means are provided in said common inlet to control the flow of air and exhaust gases from said supercharging unit.

4. The system as claimed in claim 1 wherein said air pump is connected to said branch line by means of a conduit and throttle means are provided in said conduit to control the flow of air from said air pump to said branch line.

* * * * *